United States Patent [19]

Schulze

[11] Patent Number: 4,884,451

[45] Date of Patent: Dec. 5, 1989

[54] FLUID PRESSURE MEASURING DEVICE WITH PRESSURE ATTENUATION

[75] Inventor: Dieter Schulze, Verl, Fed. Rep. of Germany

[73] Assignee: Parker-Ermeto GmbH, Bielefeld, Fed. Rep. of Germany

[21] Appl. No.: 182,545

[22] Filed: Apr. 18, 1988

[30] Foreign Application Priority Data

Apr. 18, 1987 [DE] Fed. Rep. of Germany ....... 3713236

[51] Int. Cl.<sup>4</sup> .......................... G01L 7/08; G01L 9/06
[52] U.S. Cl. ........................................ 73/706; 73/727; 338/4
[58] Field of Search ................. 73/706, 707, 721, 727; 338/4

[56] References Cited

U.S. PATENT DOCUMENTS

| | | | |
|---|---|---|---|
| 3,422,679 | 1/1969 | McGowan et al. | 73/706 |
| 4,077,261 | 3/1978 | Ring et al. | 73/706 |
| 4,668,889 | 5/1987 | Adams | 73/707 |

Primary Examiner—Donald O. Woodiel
Attorney, Agent, or Firm—Christopher H. Morgan

[57] ABSTRACT

The invention relates to a device for measuring pressures in a hydraulic or pneumatic system comprising preferably a piezoresistive pressure measuring cell disposed within the pressure housing in a pressure chamber filled with a separating fluid and separated from the medium to be measured by means of a diaphragm. In the pressure housing on the pressure input side before the pressure measuring cell or the sensor element (10.0), at least one pressure attenuation element (3.0;4.0;5.0) transferring the pressure is arranged before and/or behind the separating diaphragm (2.0). In an embodiment, a pressure attenuation element (3.0 or 5.0, resp.) is arranged on the pressure input side behind the diaphragm being provided with an elastic protective layer (2.1) turned toward the pressure attenuation element. The pressure attenuation element (3.0;4.0;5.0) consists of a microporous sintered metal, e.g. of a microporous non-iron material, a microporous ceramic material, or a stainless-steel plate with at least one passing-through microbore having a borehole diameter of equal to or less than 0.5 mm.

4 Claims, 2 Drawing Sheets

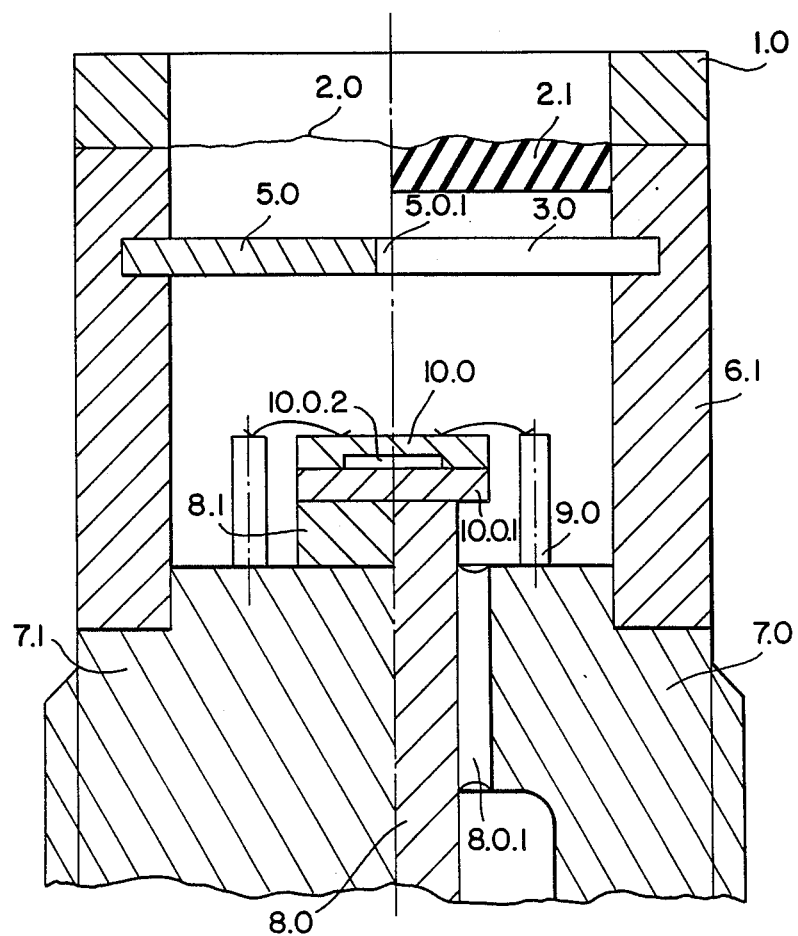
FIG. I
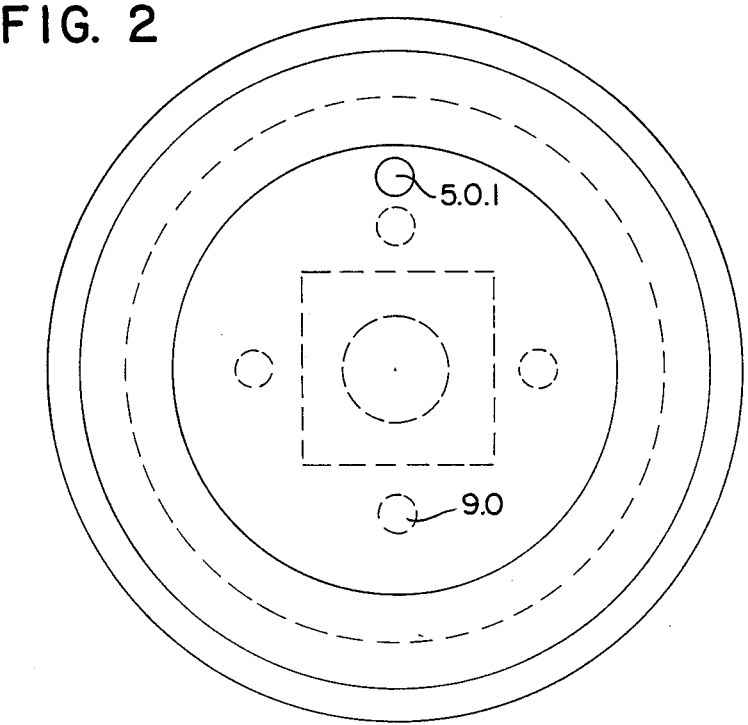
FIG. 2

4,884,451

FLUID PRESSURE MEASURING DEVICE WITH PRESSURE ATTENUATION

BACKGROUND OF THE INVENTION

The invention relates to a device for measuring pressures in a hydraulic or pneumatic system comprising preferably a piezoresistive pressure measuring cell disposed within the pressure housing in a pressure chamber filled with a separating fluid and separated from the medium to be measured by means of a diaphragm.

The performance of today's machines and installations is made possible by application of advanced fluid technology. Due to the increasing complexity of hydraulic installations, suitable measuring techniques become more and more important for start up operation and maintenance. Because down time is expensive, quick and reliable diagnosis is vital. In many cases, losses can be avoided completely by regular, preventive maintenance. For this purpose it is advantageous, if already in the design period of an installation, to provide measuring ports at suitable, easily accessible positions, said measuring ports being capable of being operated even under high pressures.

Because hydraulic systems are becoming more and more complex in the course of the rapid technical development requirements with respect to the accuracy and switching speed of the connected systems are increasing. This results in a requirement for pressure and temperature measurement methods which not only signal continuously the actual measured values, but also indicate existing problems of the installation at an early stage, i.e. immediately after occurring. In contrast to conventional pressure gauges, which are in most cases readable only in intervals and not able to make certain difficult measurements, electronic measuring systems offer a continuous recording of measured values and rapid processing of the signals with high measurement accuracy. Therefore, pressure measuring cells have gained high importance, these cells being provided with piezoresistive solid-state elements.

In such devices, the pressure to be measured deforms a diaphragm on which wire strain gauges are arranged changing their electrical resistance.

To achieve an economic production for series applications, all wire strain gauges of a Wheatstone bridge are diffused on the surface of a solid-state crystal acting, simultaneously, as the diaphragm.

For protection against environmental influences, these elements are arranged in a pressure chamber which is filled with a separating fluid and coupled to the medium to be measured by a diaphragm allowing a low pressure transmission.

In hydraulic systems, pressure peaks may occur (in particular in connection with enclosed air bubbles) which can damage the piezoresistive pressure elements and the separating elements. It is, of course, necessary to have very thin separating diaphragms in order to avoid pressure errors. Due to the kinetic energy in the flowing medium, the pressure is distributed nonuniformly over the diaphragm surface. This causes a permanent deformation of the diaphragm, and its function is thereby reduced.

Known designs of pressure measuring sensors have either no protection of the sensor or of the diaphragm, respectively, or have firmly installed covers provided with slots or holes, by which it is intended to deflect the medium flowing toward the diaphragm. Such a rigid diaphragm protection favors, however, air occlusions in hydraulic systems. The attenuating effect with respect to high pressure peaks is not sufficient to protect the sensor or the diaphragm against a deformation or even a destruction.

The sensitive sensors have, further, the property, due to their small weight, to react quickly on pressure loads from outside. This leads to the effect that in case of a pressure overload, within a few fractions of a second, a destruction of the piezoresistive crystal is possible. In a hydraulic system, short-time pressure overload peaks can, however, never absolutely be avoided.

SUMMARY OF THE INVENTION

The invention is based, therefore, on the object to improve the ruggedness of a piezoresistive measuring cell of the type described above and to provide suitable means for the protection of the sensor and, if necessary, of the separating diaphragm against pressure overloads.

The solution of this object is achieved by providing, in the pressure housing on the pressure input side before the measuring cell, at least one pressure attenuation element transmitting the pressure. This element is arranged before and/or behind the separating diaphragm.

In an embodiment of the invention, a pressure attenuation element is arranged on the pressure input side behind the separating diaphragm which is provided with an elastic protective layer facing the pressure attenuation element. The attenuation element is disposed preferably at a defined distance on the pressure input side behind the diaphragm, this distance corresponding to the maximum expansion area of the diaphragm. In this way the pressure in the pressure housing is limited, and the back-side rubber coating prevents damage to corrugations existing in separating diaphragm.

According to the invention, the elastic protective layer consists of a rubber-elastic material which is vulcanized to the diaphragm.

In another embodiment of the invention, a body consisting of a microporous sintered metal is used as pressure attenuation element.

The pressure attenuation element consists in still another embodiment of a microporous non-iron material.

According to the invention, the pressure attenuation element can also be made advantageously from a porous ceramic material.

Further, it is advantageous to use an attenuation element of a stainless-steel plate with at least one passing-through microbore, the borehole diameter of which is advantageously equal to or smaller than 0.5 mm.

For further protection of the sensor element, the area immediately above the sensor element in the pressure chamber is free from exits of the microbores of the pressure attenuation element arranged above.

For protection of the sensor element in another embodiment of the invention, the area immediately above the sensor element has a screening in the pressure chamber below the exits of the microbores of the pressure attenuation element. Thus, the sensor element is additionally protected against directly existing pressure peaks.

The invention is described in more detail based on the drawings showing several embodiments. There are:

BRIEF DESCRIPTION OF THE DRAWINGS

FIG. 1 a cross section through the mounting space of the sensor,

FIG. 2 a top view of the device shown in FIG. 1,

DESCRIPTION OF PREFERRED EMBODIMENTS

Figure 3:
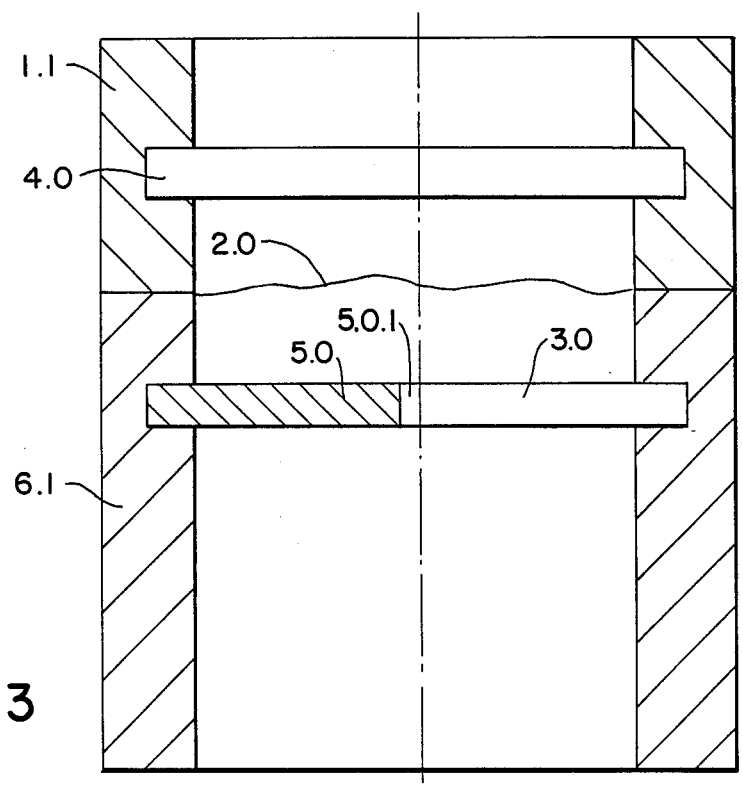
FIG. 3 a cross section through the mounting space of the pressure sensor of another embodiment, and FIG. 4 a cross section through the mounting space of the pressure sensor of still another embodiment.

FIG. 1 shows the mounting space of a pressure sensor in cross section in two different embodiments, separated by a vertical center line.

The body 7.0 serves for accommodation of the sensor element 10.0 with the mounting pin 8.0 and the electrical ducts 9.0. The mounting plate 10.0.1 accommodates the sensor element 10.0 with its space 10.0.2 arranged below, said space being arranged on the side of the sensor element turned away from pressure and allowing under pressure action on the sensor element 10.0 a deflection of the latter.

A diaphragm 2.0 being made, e.g., from steel, is fastened between the housing wall 6.1 and a protective element 1.0. This protective element has the same peripheral shape as the housing wall 6.1 which is formed in the example here as circular plate, as can be seen from FIG. 2.

In a special embodiment as shown on the right-hand side of FIG. 1, the diaphragm 2.0 is arranged in a small distance over the attenuation element 3.0. A rubber-elastic layer 2.1 is disposed under the diaphragm 2.0 and connected to it. This layer 2.1 is provided for avoiding damage to the corrugations of the diaphragm 2.0 when it is resting on the attenuation element 3.0 when overpressures are formed.

The attenuation elements 3.0, 4.0 and 5.0 are each fastened to the wall 6.1 or 1.1 resp., of the housing. The attenuation elements consist of sintered metal, e.g., stainless steel or sintered non-iron materials. However, microporous ceramic materials or metal plates can also be used as pressure attenuation elements, provided they have at least one microbore 5.01 (for this, see FIG. 2). The diameter of such a bore 5.01 is approx. 0.5 mm or less.

If a pressure is exerted from outside on the device, this pressure is transferred over the diaphragm 2.0 (as shown in FIG. 1) and the separating fluid and the pressure attenuation element 3.0 or 5.0, resp., to the measuring cell 10.0. Due to internal friction processes in the pressure attenuation element, an attenuating effect is generated such that the pressure rise velocity as well as the absolute height of pressure peaks are reduced. Thus, a protection of the measuring cell 10.0 against destruction is achieved.

In the embodiment shown in FIG. 3, the pressure attenuation element 4.0 is arranged on the pressure side before the diaphragm 2.0. Another pressure attenuation element 3.0 or 5.0, respectively is displaced behind the diaphragm 2.0 and before the sensor element (10.0) (not shown in FIG. 3). The pressure attenuation element 4.0 has the same attenuating effect as the attenuating elements described above. By the arrangement on the pressure side before the diaphragm 2.0, however, protection of the delicate diaphragm 2.0 against touching or damaging outside the application is achieved. Also, protection against nonuniform pressure loading during operation is achieved.

Figure 4:
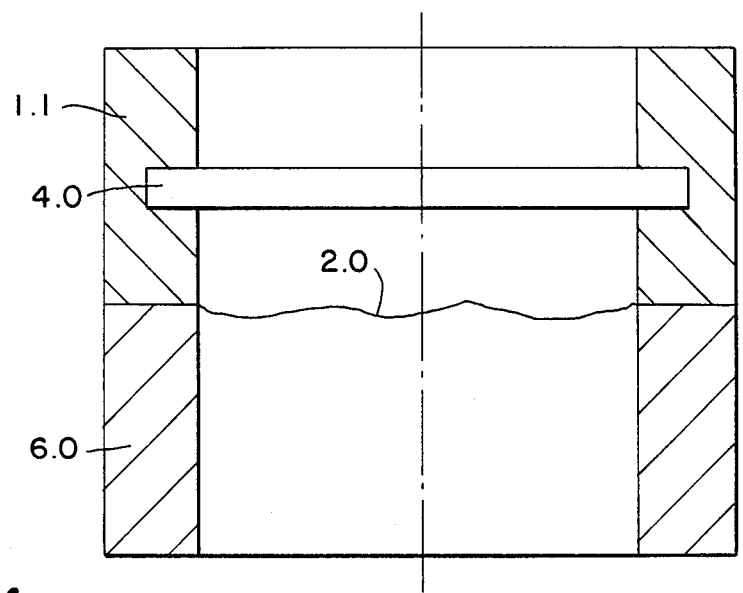

FIG. 4 shows a simplified embodiment of the device according to FIG. 3. In this device, a pressure attenuation element 4.0 is arranged on the pressure side before the diaphragm 2.0, and another pressure attenuation element is not used here.

With this device, according to the invention, high short-time pressure peaks are reduced such that they will not be dangerous for the delicate elements of the measuring device. Such delicate elements include the thin diaphragm 2.0, and, in particular, the sensor element 10.0.

I claim:

1. An improved device for measuring pressures in a hydraulic or pneumatic system of the type having a piezoresistive pressure measuring cell disposed within a pressure housing in a pressure chamber filled with a separating fluid and separated from the medium to be measured by means of a diaphragm, the improvement comprising:

a pressure attenuation element disposed in said pressure housing so that an attenuated pressure is transferred therethrough;

and said diaphragm having an elastic protective layer thereon turned toward said pressure attenuation element.

2. The device of claim 1 wherein said pressure attenuation element is disposed between the diaphragm and the piezoresistive pressure measuring cell.

3. The device of claim 2 wherein said pressure attenuation element is separated from the diaphragm by a distance corresponding to the maximum expansion area of the diaphragm.

4. The device of claim 1 wherein said elastic protective layer consists of a rubber-elastic material vulcanized to the diaphragm.

* * * * *